No. 671,187. Patented Apr. 2, 1901.
T. V. EDWARDS.
WAGON.
(Application filed Mar. 26, 1900.)
(No Model.) 2 Sheets—Sheet 1.
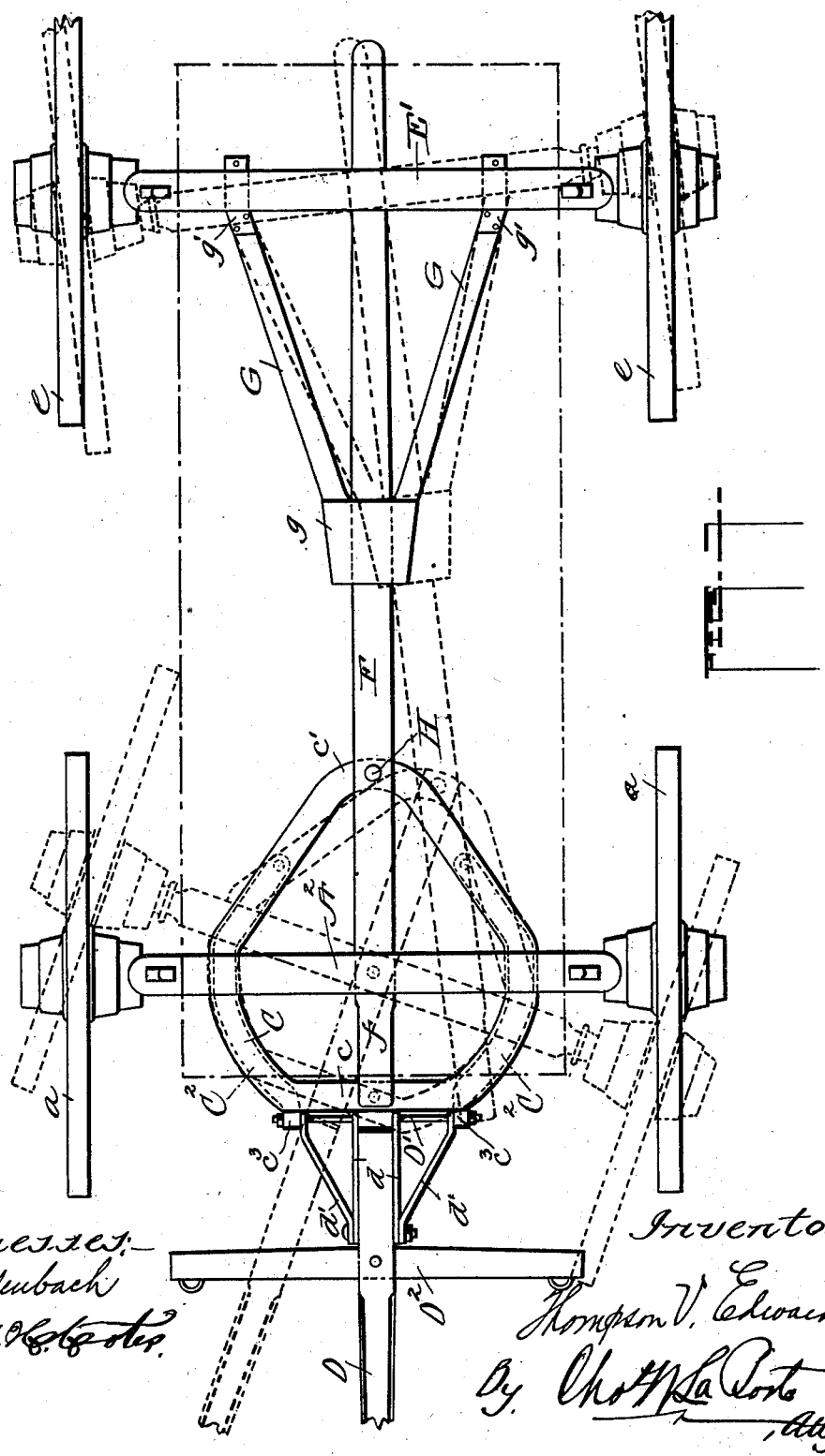

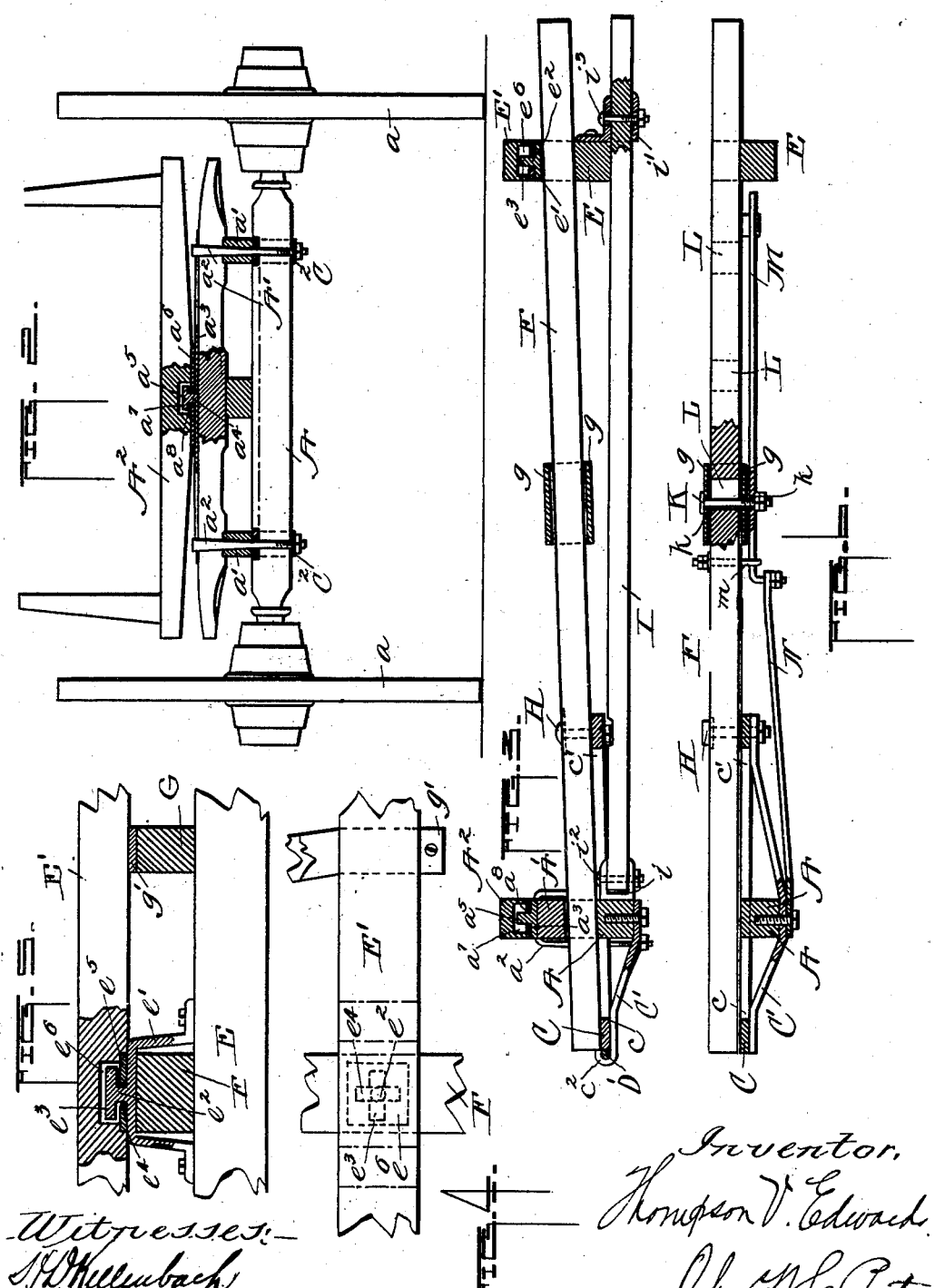

UNITED STATES PATENT OFFICE.

THOMPSON V. EDWARDS, OF PEORIA, ILLINOIS, ASSIGNOR TO FRANK H. COTES, OF SAME PLACE.

WAGON.

SPECIFICATION forming part of Letters Patent No. 671,187, dated April 2, 1901.

Application filed March 26, 1900. Serial No. 10,300. (No model.)

*To all whom it may concern:*

Be it known that I, THOMPSON V. EDWARDS, a citizen of the United States, residing at Peoria, in the county of Peoria and State of Illinois, have invented certain new and useful Improvements in Wagons; and I do hereby declare that the following is a full, clear, and exact description of the invention, which will enable others skilled in the art to which it appertains to make and use the same.

This invention relates to vehicles, and especially to that class known as "farm-wagons."

More particularly, my invention relates to a farm-wagon, having for its object the construction of a wagon capable of turning in a very short radius and combining in its construction the parts now ordinarily used, with a few additions, without in the least complicating the same, in providing a reach having a stiff bearing relation with the front and rear axle and having a reciprocal movement with relation therewith and so braced with the rear hounds as to roll in its bearing, a king-bolt or pivoted point for said reach, which shall be at a suitable point to the rear of the center of the forward axle, and of means for retaining the centers of the forward and rear axles at predetermined distances, while permitting the axle to have a swinging or rotating movement to accomplish its object—that of making a short-turn wagon.

My invention consists, essentially, of the front and rear axles; the forward sand-board and forward and rear bolsters; a reach having front and rear extensions of the forward and rear axles, the rear hounds and brace-plates forming a bearing for the central body portion of the reach; of a king-bolt having its pivotal point at a suitable distance to the rear of the center of the forward axle, being the only positive connection provided on the reach; a hound secured to the forward axle, having forward and rear bearing extensions for the reach and having the king-bolt passing through the reach and rear extension of the hound; suitable couplings for the forward and rear bolsters; an auxiliary reach having a pivotal connection with the forward and rear axles for retaining the same at equal distances from each other at all times; of the means for coupling the tongue to the forward hound to provide an upward draft from the center of the axle, and of details of construction, hereinafter more fully described, and illustrated in the accompanying drawings, in which—

Figure 1 is a plan view of the main supporting parts of a wagon with the body shown in dotted lines and the front and rear axles and the parts connected therewith in dotted lines when the wagon is being turned. Fig. 2 is an elevation, looking toward the forward part of the wagon, with certain features shown in section. Fig. 3 is a longitudinal section through the reach and component parts. Figs. 4 and 5 are details, enlarged; and Fig. 6 is a modified form of construction.

In the present invention it will be noticed that the objection which has presented itself heretofore in short-turn wagons has been entirely obviated—that is to say, many attempts have proved fruitless owing to the fact that to construct a short-turn wagon it has been necessary to remodel the plan and to introduce an entirely new plan, or to so complicate the parts as to add a great deal of additional expense to the construction, and, in fact, in many, if not the greater majority of attempts made, it has been difficult to so combine the parts as to not affect the bearing relation of the front and rear bolsters, which has caused great annoyance owing to the same becoming cramped, which places the strain upon the wagon-body, and thus fails of the object for which it was intended. While in the present construction ample provision is made when the forward axle is turned to retain the rear in its normal position relative to distance from center to center of axles and at the same time permit the rear axle to turn, as is seen in Fig. 1 of the drawings, the coupling in the reach being at a point suitably removed to the rear of the front axle and so arranged as to have a reciprocal movement, to compensate for such coupling and the turning of the rear axle the forward and rear bolsters, which are not in the least affected by this arrangement, will remain in their normal positions with the body held intact.

Referring to the drawings, A is the forward axle, provided with the ground-wheels $a$ $a$ and $A'$, the sand-board supported on the axle A on the blocks $a'$ $a'$ and suitably secured in place by means of the straps $a^2$ $a^2$. $A^2$ is the bolster, the general arrangement of the axle, sand-board, and bolster here shown being old, but the coupling between the sand-board and bolster being what I claim new.

$a^3$ is a bearing-plate secured on the upper face of the sand-board, having the centrally-disposed stud $a^4$ extending up therefrom, and $a^5$ is a lug or T-head to said stud.

$a^6$ is a bearing-plate secured to the bottom face of the bolster and is arranged to inclose the opening $a^7$ therein, at the same time being provided with the elongated slot $a^8$ in the plate, so that when making the coupling between the sand-board and bolster the bolster will be held in a position so that the slot $a^8$ in the plate will coincide with the T-head $a^5$ of the stud $a^4$, the same dropped in place and turned half around, and the same is securely coupled to the sand-board, allowing the sand-board and axle to turn free and easy on its bearing and permitting the bolster to be removed when desired.

C is a hound, preferably made of metal, and, as shown in the drawings, it has the rear V-shaped extension $c'$ and the forward section $c$, having a portion running parallel with the axle, the same being secured to the axle by means of the straps $a^2$, which pass through the same. The general outline of the hound is immaterial so long as it has bearing with the axle and is held stationary therewith and has forward and rear extensions $c$ and $c'$.

$C'$ is a centrally-disposed brace secured to the central body portion of the axle and extends up and forward and is secured to the hound portion $c$ and is provided with the bearing $c^2$.

$C^2$ $C^2$ are straps connected with the portion $c$ of the hound at suitable points on opposite sides of the center and pass beneath the axle and up and are connected to the rear portion $c'$ of the hound, the same being held in such position by the straps $a^2$, which pass through the same and have taps on the under side thereof for securing the same, the forward portions of the same being looped to form bearings $c^3$ for a purpose to be described.

D is a pole suitably coupled to the hound C, as shown, by means of the straps $d$ $d$ $d'$ $d'$, which are coupled to the rod or spindle $D'$, which has a bearing relation in the bearings $c^2$ $c^3$ of the brace $C'$ and straps $C^2$ $C^2$. The doubletree $D^2$ of the pole being placed on the under side of the pole, as shown, this method of construction and the manner of coupling the pole to the hound through the brace $C'$ and straps $C^2$ $C^2$, which are connected direct with the lower central body portions of the axle A, enables me to get a direct upward draft therefrom, relieving the horses of a very heavy strain in pulling the wagon, and when getting into ruts or uneven places enables the horses to lift the forward wheels out, where it has been impossible to do so before, and, further, saves the animals from a great deal of unnecessary wear and tear occasioned by the use of an ordinary coupling. The construction is such, also, that a stiff reach is provided which will hold the axle, sand-board, and bolsters in a vertical bearing position by reason of its connection with the hound C, preventing it being dislodged in any way by reason of any strain which may be thrown upon the wheels.

E represents the rear axle, supported on the ground-wheels $e$ $e$, and $E'$ is the rear bolster, the same having pivotal connection with the axle, the coupling being substantially similar to the forward coupling above described, coupled and uncoupled in like manner.

$e'$ is a bearing-plate having its central body portion raised and suitably fastened at its ends to the axle E. Up from the central body portion extends a stud $e^2$, provided with the T-head or lug $e^3$, adapted to pass through an elongated slot $e^4$ in the plate $e^5$, which is secured to the bolster and seated in the hollowed opening $e^6$ in the bolster.

F is a reach of the ordinary construction passing between the forward sand-board and axle and the rear axle and bolster, having a bearing relation in the bearing-plate $e'$, the reach having a somewhat-extended rear portion and the forward portion $f$ and having a bearing relation with the part $c$ of the hound.

G G are the rear hounds, suitably secured to the rear axle E at suitable points thereon and extended forward in the usual manner and carried in close proximity to the reach and suitably held in such position by means of the plates $g$ $g$. $g'$ $g'$ are bearing-plates on the rear end adjacent to the bolster, as shown.

The king-bolt coupling for the reach I provide at a point suitably located to the rear of the forward axle, and, in fact, it is the only stiff coupling that the reach has. This is made at the intersection or junction of the rear portion $c'$ of the hound C and the reach H, being the king-bolt passing through the same and secured in the ordinary manner.

To retain the center bearing-points of the axles in their extended positions, as shown, and to keep the bolsters from cramping as their axles are turned, I provide the auxiliary reach I, coupled in the plates $i$ $i'$, which are secured to the axles A and E, as shown, by means of the pins $i^2$ $i^3$, the plate $i'$ being slotted to permit the reach to roll in its bearings when occasion requires. This feature is also made possible in the reach F by reason of there being no stiff connection with the rear hound G G between the plates $g$ $g$, permitting the reach when an obstruction is contacted with to roll sufficiently to relieve it of all strain, and thus saving it from being destroyed.

The reach F, as well as the reach I, have long enough extensions to the rear of the axle E so that the main bed of the wagon may be extended, as is the case when it is desired to use the bed for a hay-rack.

In Fig. 6 I have shown a modified means for coupling the reach and for retaining the center bearing-points of the axle, so as to relieve the strain on the wagon-body and do away with the auxiliary reach I and the couplings on the axles. The same parts, such as the axles A and E, are retained, and the reach F and the king-bolt are coupled at the same point or at the intersection of the part c with the reach. I use the rear hounds G, which are coupled in the plate g, forming a bearing through which the reach passes, with the exception that I pass a pin K through the plates g and reach and slot the plate at k to allow the reach to roll and also provide a series of elongated slots L to enable the reach to reciprocate in its bearings as the axle A is turned and provide the series so as to lengthen the bed. The substitute coupling which I provide for the reach I is formed of the rod M, lying beneath the reach and held by the pin K, and passing through the staple m has a pivotal connection with an auxiliary rod N, which is connected with the lower central body portion of the axle A, as shown. Thus I accomplish practically the same result with this manner of coupling as with an auxiliary reach, although the auxiliary reach is the much preferred coupling; but I do not wish to limit myself, as the same result may be obtained by this latter coupling, and as it is a part of my original idea I wish to disclose it herein.

The object of my invention and the utility of my improved wagon may be better understood from a description of the operation of my device. The arrangement and combination of elements being understood from the references given above relative to the figures, it being desired to turn the wagon substantially as is shown in Fig. 1, the hound C', to which the reach is coupled, moving in a larger radius with reference to the center of the axle A and the central given line between the axles, it becomes necessary for the reach to move forward in its bearings, which is accomplished by reason of the same having no stiff connections other than the one with the hounds, and, by reason of its manner of coupling with the hounds, will cause the same to be shifted to one side, turning the rear axle in its bearings, so that when either of the forward outside wheels are making the large radius the rear wheel on the opposite side will be turned to make the short radius.

Having thus fully described my invention, what I claim, and desire to secure by Letters Patent, is—

1. A wagon comprising the ordinary forward and rear axles, a reach connecting the same, and reciprocating across the axial centers thereof, a king-bolt coupling for said reach at a point H to the rear of the front axle, means as provided enabling the front and rear axles to describe an arc of a circle without affecting the relation of the bolsters carried thereby, substantially as specified.

2. In a vehicle-gear, the combination with the axles and hounds, the hound C, having portions carried in front and rear of the axle, the reach F, having a pivotal connection with the rear extension of the hound C, the forward end of the reach having a bearing relation with the front extension of the hound and the rear portion thereof arranged to reciprocate in its support and across the axis of the rear axle, substantially as described.

3. In a wagon, the combination with the forward axle, sand-board and bolster, of the coupling for said sand-board and bolster substantially as specified, a hound attached to said axle and having forward and rear extensions thereof, a reach having a bearing relation with the forward and rear extensions of the hound, a king-bolt coupling for said reach at the intersection of the rear extension of the hound with the reach, means provided whereby said reach may reciprocate when the wagon is being turned, substantially as and for the purpose described.

4. In a vehicle-gear, the combination with the axles and hounds, the coupling for the forward bolster and sand-board, and the rear bolster and axle substantially as shown, the reach I, connecting the axles arranged to hold their centers equidistant at all times, the reach F, connecting the axles and arranged to reciprocate across each axle, the forward end of the reach having a pivotal connection with the bed and having a support in front of the forward axle, all substantially as described.

5. The combination with the axle A, and sand-board, of the hound C, secured to said axle and provided with forward and rear extensions thereof, a reach passing between said axle and sand-board and having a pivotal relation with the rear extension of said hound, substantially as and for the purpose described.

6. In a wagon, a reach therefor having its pivotal connection at a point to the rear of the forward axle, a hound connected with the axle and providing a stiff bearing relation between the axle and reach, the means for supporting said reach between the axles that it may have a reciprocal movement with relation thereto, and arranged to roll in said support, a supplemental reach for said wagon secured in suitable bearings supported by the axles, the means for coupling the axles with the bolsters enabling both forward and rear axles to turn in their bearings without affecting the wagon-body thereof, substantially as described.

7. The coupling for a wagon-bed, consisting of a reach having a pivotal connection with the bed at a point to the rear of the front axle, a supplemental reach for said bed, carried in the same longitudinal plane beneath the first-named reach, and suitably connected with the axles as described, substantially for the purpose set forth.

8. A supplemental reach for a wagon-bed, consisting of a stiff reach relative to longitudinal movement, carried in a plane beneath the reach F, and coupled with the front and rear axles in such a manner as to permit the same to turn on their centers, substantially in the manner and for the purpose set forth.

9. The coupling for a wagon-bed, consisting in the combination with the axles A and E, of the hound C, having forward and rear extensions, the reach F, connecting the axles and having a pivotal connection with the bed at the intersection of the rear portion of the hound with the reach, suitable couplings with the axles of the bolsters $A^2$, and $E'$, the supplemental reach I, suitably connected with the axles in a plane beneath the reach F, whereby when the forward axle A, is describing an arc of a circle, the reach F, will reciprocate in its bearings with the bed and permit the rear axle to describe an arc to swing the bed in a very short radius, the supplemental reach by means of its coupling retaining the central bearing-points of the axles at all times normal, substantially for the purpose set forth.

In testimony whereof I affix my signature in presence of two witnesses.

THOMPSON V. EDWARDS.

Witnesses:
CHAS. W. LA PORTE,
H. D. KELLENBACH.